United States Patent [19]

Jackson, Jr.

[11] 4,260,031
[45] Apr. 7, 1981

[54] SOLIDS DIVERTER FOR A DOWNHOLE DRILLING MOTOR

[75] Inventor: G. C. Jackson, Jr., Dallas, Tex.

[73] Assignee: Dresser Industries, Inc., Dallas, Tex.

[21] Appl. No.: 75,561

[22] Filed: Sep. 14, 1979

[51] Int. Cl.³ .............................................. E21B 4/02
[52] U.S. Cl. .................................... 175/107; 415/111; 415/502
[58] Field of Search ................ 175/107, 337; 415/502, 415/503, 111

[56] References Cited

U.S. PATENT DOCUMENTS

| | | | |
|---|---|---|---|
| 3,065,416 | 11/1962 | Jeter | 324/70 |
| 3,401,758 | 9/1968 | Talbert | 175/337 X |
| 3,456,746 | 7/1969 | Garrison et al. | 175/107 |
| 3,516,718 | 6/1970 | Garrison et al. | 308/230 |
| 3,666,329 | 5/1972 | Bell | 175/337 X |
| 3,788,408 | 1/1974 | Dysart | 175/337 |
| 3,936,247 | 2/1976 | Tschirky et al. | 175/337 X |
| 3,982,859 | 9/1976 | Tschirky et al. | 175/107 X |
| 4,029,368 | 6/1977 | Tschirky et al. | 308/8.2 |

FOREIGN PATENT DOCUMENTS 1311336 10/1962 France ..................... 175/107

Primary Examiner—Ernest R. Purser
Attorney, Agent, or Firm—Fred A. Winans; Eddie E. Scott

[57] ABSTRACT

A downhole drilling motor located near the end of a rotary drill string is operated by the drilling mud for driving a rotary drill bit to drill an oil or gas well or the like. Fluid lubricated bearings are employed and a portion of the drilling fluid is diverted through the bearings of the downhole motor with the balance of the drilling fluid being discharged through ports of the drill bit. The diverted portion of the drilling fluid is transmitted along a flow path that results in an abrupt change of direction of flow. The flow path will purge a portion of the drilling fluid of unwanted solids by diverting the solid along with the main portion of the drilling fluid through the motor and through and out of the drill bit. The entry of large contaminating solids or high-density and abrasive solids to the bearings is restricted. This prevents plugging of flow through the bearings and reduces wear in the bearings by reducing the volume of abrasive solids.

2 Claims, 4 Drawing Figures

SOLIDS DIVERTER FOR A DOWNHOLE DRILLING MOTOR

BACKGROUND OF THE INVENTION

The present invention relates in general to the art of earth boring and, more particularly, to a downhole drilling motor that is carried near the end of a rotary drill string and actuated by the down-flowing drilling mud thereby driving a rotary drill bit for the drilling of oil and gas wells and the like.

The conventional U.S. system of oil well drilling involves the rotation of the string of drill pipe with a rotary drill bit located at the end of the drill string. During drilling, mud is pumped downward through the drill string to remove the material loosened by the drill bit. A drilling system that is also known involves the use of a downhole drilling motor powered by the circulating drilling mud. Downhole motors presently in use or potentially usable are electric or fluid (turbine, Moineau, and vane type) motors. The downhole motor operates in a fluid-laden borehole and the atmosphere of highly abrasive fluid stands in the way of any normal lubrication of the wear parts. Its limited diameter limits the internal design beyond that possible with motors used above ground. When fluid-lubricated bearings are employed abrasive contaminants in the drilling fluid will be circulated through the bearings and cause excessive wear and premature bearing failure. The present invention provides means to divert these abrasive contaminants through the shaft bore, along with the majority of the drilling fluid flow.

DESCRIPTION OF PRIOR ART

The downhole motors have a thrust bearing and a radial bearing section which supports the rotating member, to which a drill bit is attached, from a stationary section to which the drill string is attached. While many prior art systems exist to seal this bearing section to contain a limited volume of lubricant to prolong bearing life, they have the inherent weakness of maintaining a seal in the environment of temperature, contaminated drilling fluid, and pressure drop across the seal or seals. Fluid-lubricated bearings are used in downhole motors but they do not include means to reduce the quantity of plugging or abrasive solids which pass through the bearings in the bearing section. Examples of bearing systems in downhole motors are shown in U.S. Pat. No. 3,456,746, U.S. Pat. No. 3,516,718 and U.S. Pat. No. 4,029,368. In U.S. Pat. No. 3,788,408 to Theodore R. Dysart patented Jan. 29, 1974 a water deflector and separator for rotary rock bits is shown.

SUMMARY OF THE INVENTION

A downhole drilling motor is located near the end of a rotary drill string and may be operated by the circulating drilling mud for driving a rotary drill bit or by other power means. Fluid-lubricated bearings are employed in the downhole motor and a portion of the drilling fluid is diverted through the bearings of the motor with the balance of the drilling fluid being discharged through ports in the drill bit. The diverted portion of the drilling fluid is transmitted along a flow path that results in an abrupt change of direction of flow. The flow path will purge a portion of the drilling fluid of unwanted solids by diverting the solids along with the main portion of the drilling fluid through the motor and through and out of the drill bit. The entry of large contaminating solids or high-density and abrasive solids to the bearings is restricted. This prevents plugging of flow through the bearings and reduces wear in the bearings by reducing the volume of abrasive solids. The above and other features and advantages of the present invention will become apparent from a consideration of the following detailed description of the invention when taken in conjunction with the accompanying drawings.

DETAILED DESCRIPTION OF THE INVENTION

Figure 1:
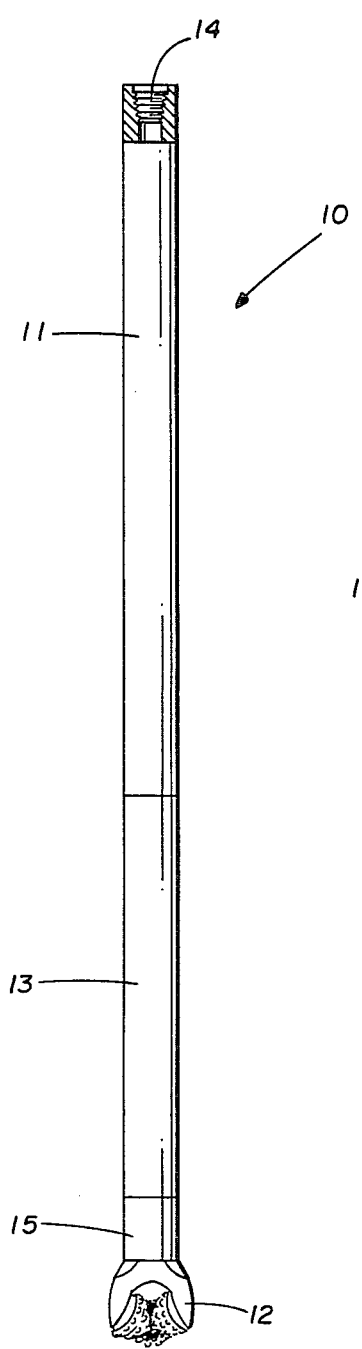
FIG. 1 is a longitudinal view illustrating a downhole drilling motor.

Referring now to the drawings and to FIG. 1 in particular, a downhole motor is illustrated and generally designated by the reference number 10. The downhole motor 10 is provided with a non-sealed bearing section 13 and a power section 11. The power section 11 may be any suitable type of power device. For example, the power section 11 may be a hydraulic turbine, a Moineau pump running backward, electric, or vane-type motor as the power source.

Hydraulic fluid under pressure is fed to or past the power section 11. The power section 11 is connected to the lower end of a drill string of tubular members extending to the surface. The threaded connection 14 allows the power section 11 to be connected to the drill string. The drilling fluid is circulated through or around the power section 11 and to bearing section 13. The lower end of the bearing section 13 is connected to a rotating bit sub 15 which carries the drill bit 12.

The downhole motor 10 has the fluid flow divided at some juncture in bearing section 13. A necessary majority of the total flow is discharged through the bit 12 to clean the bottom of the hole with a desirable smaller amount diverted through the bearings to cool the bearings, to provide some lubrication to the bearings, and to flush wear particles from the bearing section. The present invention prevents larger or heavier solids from plugging or packing between the stationary bearing members and the rotating bearing members. Such drilling fluid contaminants as gravel, rubber, sticks, etc., regularly damaged or plugged the bearings and caused excessive wear in prior art downhole drilling motors.

Figure 2:
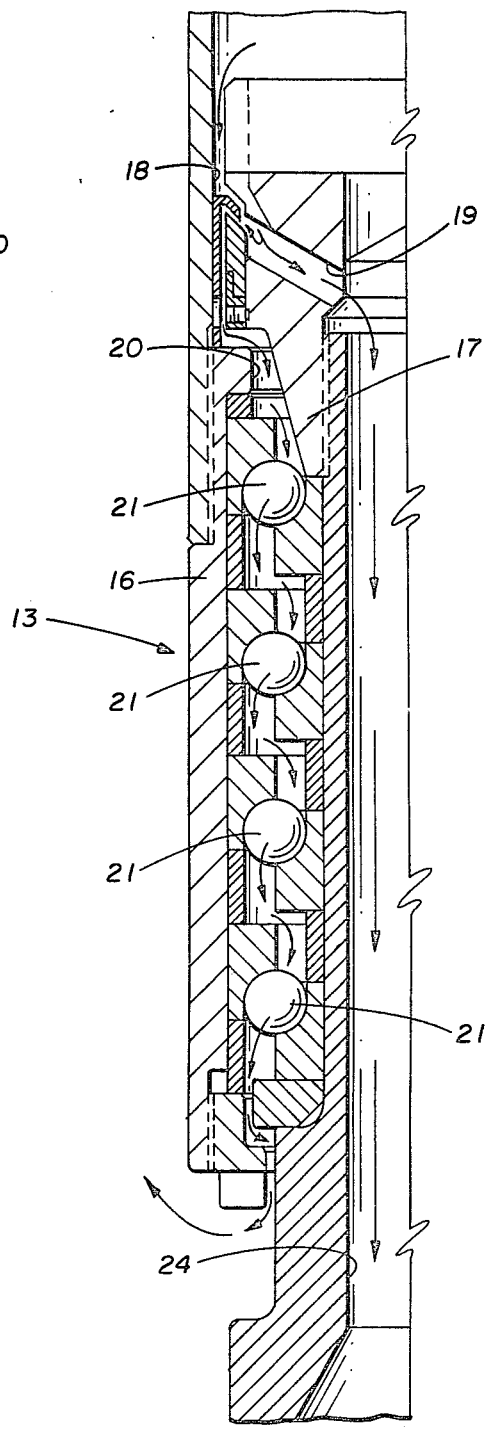
FIG. 2 is a sectional view illustrating the bearing section of a downhole drilling motor constructed in accordance with the present invention.

Referring now to FIG. 2, a sectional view of the left side of the bearing section 13 of the downhole motor 10 is shown. The drive mandrel 17 rotates within the outer mandrel 16. The bearings 21 allow rotation of the drive mandrel 17. The circulating drilling mud is divided and a portion of the drilling mud is diverted through the bearings 21. Drilling mud enters the bearing section 13 from the power section above through passage 18. A portion of the drilling mud is diverted through passage 20 to the bearings. The remaining portion of the drilling mud continues through the passage 19 and is directed to the drill bit through the central annulus 24 of the bearing section 13.

The present invention provides a path for the drilling fluid to cool and lubricate the bearings. The flow path is reversed in an upward direction from the main downward flow in a high-velocity section as the drilling fluid exits from the annulus under the power section and enters into the bore of the rotor shaft through ports. The inertia of the higher density solids compared to the drilling fluid or the fluid force on large, low density solids purges these contaminants from the fluid entering the port to the bearings and causes them to continue into the bore of the rotor shaft to be discharged through the bit. The bearings are protected from plugging and their life is extended. Fewer abrasive solids are carried in the luricating mud or fluid that is diverted through the bearings.

Figure 3:
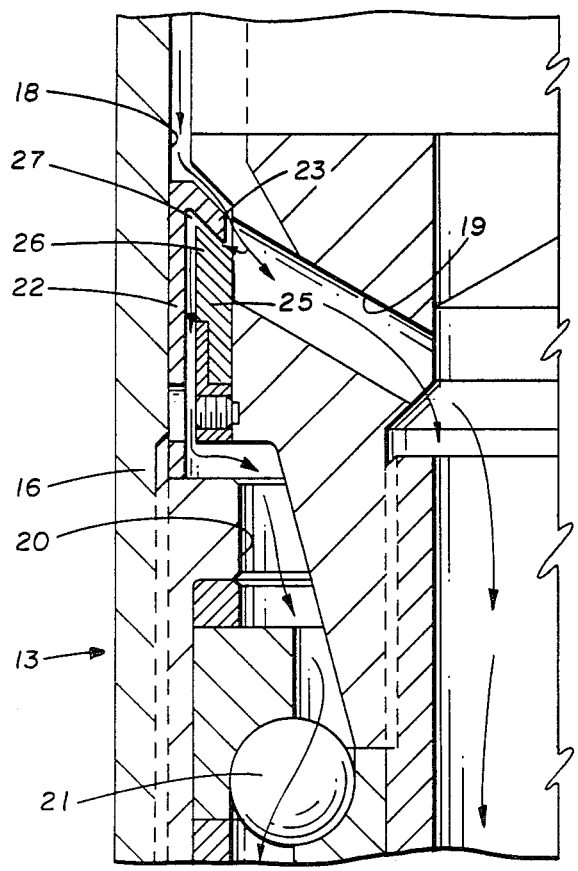
FIG. 3 is an enlarged view of the solids diverter portion of the downhole drilling motor illustrated in FIG. 2.

Referring now to FIG. 3, an enlarged view of the diverter section is shown. The drilling mud entering the bearing section 13 through passage 18 is divided. A portion continues through passage 19 to the drill bit and a portion is diverted through passage 20 to the bearings 21. An annular collar 22 is fitted and sealed within the outer stationary housing 16. The annular collar includes a downward and inwardly projecting lip 23. Positioned below the lip 23 is an annular orifice collar 25 with an upwardly extending lip 26. The lips are spaced apart forming a fluid passage 27. Drilling mud entering passage 27 must change directions abruptly. The inertia of higher density solids than the drilling fluid and the fluid force on large, low density solids, prevents these contaminants from entering the passage 27 and being carried to the bearings 21. The contaminants will continue into the passage 19 to be discharged through the bit. Thus, the bearings are protected from plugging and their life is extended.

Figure 4:
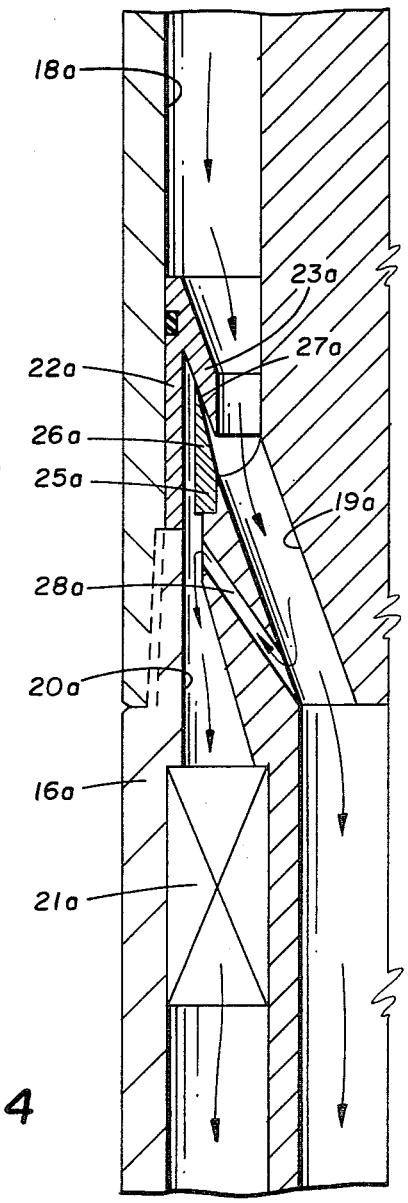
FIG. 4 is an illustration of another embodiment of the present invention.

Referring now to FIG. 4, an enlarged view of a diverter section of another embodiment of a downhole motor constructed according to the present invention is shown. The drilling mud entering the bearing section through passage 18a is divided in a different manner. A portion continues through passage 19a to the drill bit and a portion is diverted through passage 20a in a different manner to bearings 21a. The annular collar 22a is fitted and sealed within the outer stationary housing 16a. The annular collar includes a downward and inwardly projecting lip 23a. Positioned below the lip 23a is an annular orifice collar 25a with an upwardly extending lip 26a. The lips are spaced for closure requiring a pressure differential from passage 18a to passage 20a to force the flexible lip 26a outwardly to form a passage at 27a. A second passage 28a is a drilled hole connecting passage 19a upwardly to passge 20a. Passage 28a or orifice allows a necessary minimum amount of fluid to the bearings. Should passage 28a become plugged the pressure differential from passage 18a to passage 20a would increase opening the closure at 27a to a passage. Drilling mud entering passage 28a and/or 27a must change directions abruptly. The diversion of contaminants from entering bearings 21a are the same as described in the previous FIG. 3.

The embodiments of the invention in which an exclusive property or privilege is claimed are defined as follows:

1. An improved downhole drilling motor having a relatively rotatable cylindrical external member and a relatively rotatable cylindrical internal member disposed therein and defining a vertically oriented annular chamber therebetween and bearing structure interposed in said chamber for rotatably supporting said internal member from said external member, said members cooperating to define a first drilling fluid passage for delivering drillng fluid through said motor, said first passage terminating above said chamber in a second fluid passage for directing a major portion of said drilling fluid into and through said internal member and wherein the improvement comprises:

diverter passage means for directing a lesser portion of said fluid into said annular chamber from said second fluid passage, said diverter passage means defining a flow path generally oppositely directed from the second fluid passage and having a generally restricted opening from ssaid second fluid passage whereby particulate matter entrained in said drilling fluid substantially continues flowing in the normal flow path through said second fluid passage to said internal member and remains separated from said portion entering said diverter passage means therefrom.

2. Structure according to claim 1 wherein said second fluid passage means is oriented in an inwardly downwardly direction to deliver fluid to the center of said internal member and said diverter passage means is oriented in an outwardly upwardly direction and opens into said second fluid passage so that the major portion of fluid flowing across said opening in said second passage carries with it the debris within said drilling fluid.

* * * * *